United States Patent
Hwang et al.

(10) Patent No.: US 9,900,751 B2
(45) Date of Patent: Feb. 20, 2018

(54) METHOD AND APPARATUS TO IMPROVE MBMS COUNTING IN LTE

(75) Inventors: Woonhee Hwang, Espoo (FI); Henri Markus Koskinen, Espoo (FI); Jarkko T. Koskela, Oulu (FI)

(73) Assignee: Nokia Technology Oy, Espoo (FI)

( * ) Notice: Subject to any disclaimer, the term of this patent is extended or adjusted under 35 U.S.C. 154(b) by 313 days.

(21) Appl. No.: 14/347,956

(22) PCT Filed: Sep. 29, 2011

(86) PCT No.: PCT/EP2011/067050
§ 371 (c)(1),
(2), (4) Date: Jun. 26, 2014

(87) PCT Pub. No.: WO2013/044971
PCT Pub. Date: Apr. 4, 2013

(65) Prior Publication Data
US 2014/0307616 A1    Oct. 16, 2014

(51) Int. Cl.
*H04W 4/06* (2009.01)
*H04W 72/00* (2009.01)
*H04W 8/06* (2009.01)
*H04W 60/04* (2009.01)
*H04W 88/06* (2009.01)

(52) U.S. Cl.
CPC .............. *H04W 4/06* (2013.01); *H04W 8/06* (2013.01); *H04W 72/005* (2013.01); *H04W 60/04* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 9,008,570 B2* | 4/2015 | Lee | H04W 4/06 455/3.01 |
| 2007/0206530 A1* | 9/2007 | Lee | H04W 60/04 370/329 |
| 2008/0031245 A1* | 2/2008 | Pekonen | H04L 12/1886 370/390 |
| 2008/0273482 A1* | 11/2008 | Lee | H04W 72/005 370/312 |

(Continued)

FOREIGN PATENT DOCUMENTS

| CN | 101854591 A | 10/2010 |
|---|---|---|
| GB | 2 448 128 | 10/2008 |

(Continued)

OTHER PUBLICATIONS

"Limitations Regarding MBMS Counting", 3GPP TSG-RAN2#74 meeting, R2-113157, Agenda Item: 6.3, Samsung, May 9-13, 2011, 2 pages.

(Continued)

*Primary Examiner* — Andrew Lai
*Assistant Examiner* — Jamaal Henson
(74) *Attorney, Agent, or Firm* — Nokia Technologies Oy (57) ABSTRACT

A method comprising: receiving a first message at a user equipment from a first apparatus; receiving from a primary access node at least one network identifier value; comparing a user equipment registered network identifier value to the at least one network identifier value from the primary access node; and responding to the first message dependent on the user equipment registered network identifier value being equal to any primary access node network identifier value.

19 Claims, 3 Drawing Sheets

(56) References Cited

U.S. PATENT DOCUMENTS

| | | | | |
|---|---|---|---|---|
| 2009/0047957 | A1* | 2/2009 | Westerberg | H04W 36/14 455/436 |
| 2010/0265867 | A1* | 10/2010 | Becker | H04W 72/005 370/312 |
| 2011/0019604 | A1* | 1/2011 | Chun | H04L 1/1887 370/312 |
| 2011/0250892 | A1* | 10/2011 | Gupta | H04W 36/0011 455/437 |
| 2012/0263089 | A1* | 10/2012 | Gupta | H04W 72/005 370/312 |
| 2013/0130616 | A1* | 5/2013 | Lee | H04W 4/06 455/3.01 |

FOREIGN PATENT DOCUMENTS

| | | |
|---|---|---|
| JP | 10-243023 A | 9/1998 |
| JP | 2010-525759 A | 7/2010 |
| WO | 2010/121398 | 10/2010 |
| WO | 2012/138067 A2 | 10/2012 |
| WO | 2012/138067 A3 | 10/2012 |

OTHER PUBLICATIONS

Office action received for corresponding Japanese Patent Application No. 2014-530105, dated Aug. 6, 2015, 7 pages of office action and 3 pages of office action translation available.

"Stage-3 CR Describing the Interactions Between RRC and the Upper Layers for MBMS", 3GPP TSG-RAN WG2 Meeting #72, R2-106235, Agenda: 9.4.0, IPWireless Inc., Nov. 15-19, 2010, 8 pages.

International Search Report received for corresponding Patent Cooperation Treaty Application No. PCT/EP2011/067050, dated Jun. 2, 2012, 4 pages.

Nokia Siemens Networks et al: "Limiting MBMS counting responses to within the PLMN", 3GPP draft; R2-114991 CR 36331 Limiting MBMS Coutning Responses to Within the PLMN, 3rd Generation partnership Project (3GPP), Mobile Competence Centre; 650 Route Des Lucioles; F-06921, Sophia-Antipolis Cedex; France, vol. RAN WG2, no. Zhuhai; Oct. 10, 2011, Oct. 3, 2011.

"3rd Generation Partnership Project; Technical Specification Group Radio Access Network; Evolved Universal Terrestrial Radio Access (E-UTRA); Radio Resource Control (RRC); Protocol specification (release 10)", 3GPP Standard,; 3GPP TS 36.331, 3rd Generation Partnership Project (3GPP), Mobile Competence Centre; 650, Route Des Lucioles; F-06921 Sophia-Antipolis Cedex; France; No. V10.1.0, Mar. 30, 2011, pp. 1-290.

Office action received for corresponding European Patent Application No. 11767414.3, dated Dec. 10, 2015, 3 pages.

Office action received for corresponding Chinese Patent Application No. 201180073844.3, dated Oct. 10, 2016, 5 pages of office action and no pages of office action translation available.

Office action received for corresponding European Patent Application No. 11767414.3, dated Mar. 28, 2017, 6 pages.

* cited by examiner

METHOD AND APPARATUS TO IMPROVE MBMS COUNTING IN LTE

RELATED APPLICATION

This application was originally filed as PCT Application No. PCT/EP2011/067050 filed Sep. 29, 2011.

FIELD OF THE INVENTION

The application relates to communication apparatus and in particular but not exclusively to apparatus for multimedia broadcast-multicast service management in long term evolution communication systems.

BACKGROUND OF THE INVENTION

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

An example of communication systems attempting to satisfy the increased demands for capacity is an architecture that is being standardized by the 3rd Generation Partnership Project (3GPP). This system is often referred to as the long-term evolution (LTE) of the Universal Mobile Telecommunications System (UMTS) radio-access technology. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

One aspect of LTE is that a Multimedia Broadcast/Multicast Service (MBMS) for a Universal Mobile Telecommunications System (UMTS) can be provided. The MBMS uses broadcast or multicast message distribution instead of several point-to-point links for communicating to several end user equipments.

A UE that operates in a UMTS or LTE network can obtain communication services using procedures according to a standard defined by the 3GPP. The standard specifies, for both of these networks, radio system parameters, data transfer procedures, network protocols, control messages and bearer traffic exchange to take place over the air interface. The MBMS can allow efficient session management by enabling service data packets to be transferred in an efficient way to multiple UEs within these networks. For this purpose, a message can be transmitted from a core network node to several node Bs (nBs). Each NB can then send a unidirectional point-to-multipoint (PtM) transmission to UEs so that a UE in an idle or active mode receives network service data.

In a multicarrier environment an MBMS broadcast/multicast may be configured for a certain cell layer to provide efficient radio resource usage for the MBMS broadcast/multicast.

Long term evolution (LTE) release 9 (LTE Rel-9) standards included a basic MBMS functionality of pure broadcast mode transmission with no uplink feedback loop of any form. However in order that the control entity supporting multimedia broadcast multicast service (MBMS) can allocate resources efficiently, information regarding the user equipment receiving the broadcast is typically gathered.

The control information relevant for user equipment supporting MBMS is generally separated as much as possible from unicast control information. Standard releases such as release 10 (LTE Rel-10) have specified feedback in terms of counting to aid the operators decision making on what services to broadcast. In other words the user equipment can indicate whether or not they are interested in receiving these services indicated in the counting request.

The counting response RRC message defined in LTE Rel-10 contains only references to the contents of the counting request to which it is addressed. However there may be problems in a multicarrier scenario where a user equipment sends a counting response message to a cell different to that broadcasting the counting request. This response thus can lead to problems of determining to what exactly the response refers to. In the worst case scenario the network associates the counting responses to the wrong counting procedure making the results erroneous.

Whilst it has been generally agreed that the user equipment can send counting responses to a serving cell regardless of the relationship to the cell broadcasting the counting request, typically it is assumed that coordination on the network side ensures at any given location no two counting procedures are carried out at the same time.

However should the user equipment receive a counting request from another public land mobile network (PLMN), in other words a network operated by a different operator from that serving the user equipment, the user equipment should not respond to the request (as the two separate networks cannot be guaranteed to not be operating counts at the same time). Coordination between the two networks in such an example to avoid two counting procedures being carried out at the same time at any location furthermore is typically difficult to achieve across different public land mobile networks.

There is an additional problem associated with the scenario shortly following an inter-PLMN handover to a cell which is no longer broadcasting the identity of the user equipment registered PLMN. In such an example the user equipment can receive or discover a counting request being broadcast on a cell of a frequency carrier where the user equipment is receiving MBMS and still answer the counting request procedure incorrectly as the access stratum of the user equipment still considers the registered public land mobile network (RPLMN) to be the one used in the previous cell. In the converse case for the same reasons, a user equipment may also not respond to an observed counting request even though the PLMN identity broadcast by the target cell of the handover would actually warrant it.

If the new cell broadcasts the PLMN identity of the RPLMN, then the RPLMN can stay the same and there is no need to do anything. However, in the case of interest where the new cell does not broadcast the identity of the RPLMN then a tracking area update (TAU) is required and the RPLMN value will change in the procedure.

Thus the problem is that the access stratum of the user equipment will determine whether or not to answer to a counting request without checking whether or not the RPLMN is still valid in the current serving cell.

Statement of Application

Embodiments of the application aim to address one or several of the above issues.

According to an aspect of the application there is provided a method comprising: receiving a first message at a user equipment from a first apparatus; receiving from a primary access node at least one network identifier value; comparing a user equipment registered network identifier value to the at least one network identifier value from the primary access node; and responding to the first message dependent on the user equipment registered network identifier value being equal to any primary access node network identifier value.

The method may further comprise: receiving from the first apparatus at least one network identifier value; comparing the at least one network identifier value from the first apparatus to a user equipment registered network identifier value; wherein responding to the first message is further dependent on any network identifier value from the first apparatus being equal to the user equipment registered network identifier value.

The method may further comprise determining the user equipment registered network identifier.

The user equipment registered network identifier value may comprise the registered public land mobile network identifier.

The method may further comprise: performing a tracking area update for the user equipment when the user equipment registered network identifier value is different from every primary access node network identifier value; updating the user equipment registered network identifier value; comparing the updated user equipment registered network identifier value to the at least one network identifier value from the first apparatus; and responding to the first message dependent on the updated user equipment registered network identifier value being equal to one of the network identifier values from the first apparatus.

The first message may be a Multimedia Broadcast-Multicast Service 'MBMSCountingRequest' message.

Responding to the first message may comprise: generating a Multimedia Broadcast-Multicast Service 'MBMSCountingResponse' message; and transmitting the Multimedia Broadcast-Multicast Service 'MBMSCountingResponse' message to an access node.

The first apparatus may comprise at least one of: a base station within a network with the network identifier value; and an enhanced NodeB (eNB) broadcasting a multimedia broadcast-multicast services control channel (MCCH).

The primary access node may comprise at least one of: a primary cell serving the user equipment; and a primary cell enhanced NodeB.

The method may further comprise: monitoring at least one control channel from the first apparatus wherein the at least one control channel comprises the first message.

The network identifier value may be a public land mobile network identifier value.

The user equipment registered network identifier value may comprise the registered public land mobile network identifier value.

The at least one network identifier value may be received in a system information broadcast message.

The primary access node may be the first apparatus.

According to a second aspect of the application there is provided apparatus comprising: means for receiving a first message at a user equipment from a second apparatus; means for receiving from a primary access node at least one network identifier value; means for comparing an apparatus registered network identifier value to the at least one network identifier value from the primary access node; and means for responding to the first message dependent on the apparatus registered network identifier value being equal to any primary access node network identifier value.

The apparatus may further comprise: means for receiving from the second apparatus at least one network identifier value; and means for comparing the at least one network identifier value from the second apparatus to the apparatus registered network identifier value; wherein the means for responding to the first message is further dependent on any network identifier value from the second apparatus being equal to the apparatus registered network identifier value.

The apparatus may further comprise means for determining the apparatus registered network identifier.

The apparatus registered network identifier value may comprise the registered public land mobile network identifier.

The apparatus may further comprise: means for performing a tracking area update for the apparatus when the apparatus registered network identifier value is different from every primary access node network identifier value; means for updating the apparatus registered network identifier value; means for comparing the updated apparatus registered network identifier value to the at least one network identifier value from the second apparatus; and means for responding to the first message dependent on the updated apparatus registered network identifier value being equal to one network identifier values from the second apparatus.

The first message may be a Multimedia Broadcast-Multicast Service 'MBMSCountingRequest' message.

The means for responding to the first message may comprise: means for generating a Multimedia Broadcast-Multicast Service 'MBMSCountingResponse' message; and means for transmitting the Multimedia Broadcast-Multicast Service 'MBMSCountingResponse' message to an access node.

The apparatus may be a user equipment.

The second apparatus may comprise at least one of: a base station within a network with the network identifier value; and an enhanced NodeB (eNB) broadcasting a multimedia broadcast-multicast services control channel (MCCH).

The primary access node may comprise at least one of: a primary cell serving the apparatus; and a primary cell enhanced NodeB.

The apparatus may further comprise: means for monitoring at least one control channel from the second apparatus wherein the at least one control channel comprises the first message.

The network identifier value may be a public land mobile network identifier value.

The apparatus registered network identifier value may comprise the registered public land mobile network identifier value.

The at least one network identifier value may be received in a system information broadcast message.

The primary access node may be the second apparatus.

According to a third aspect of the application there is provided an apparatus comprising at least one processor and at least one memory including computer program code, the at least one memory and computer program code configured, with the at least one processor, to cause the apparatus to perform: receiving a first message at a user equipment from a second apparatus; receiving from a primary access node at least one network identifier value; comparing an apparatus registered network identifier value to the at least one network identifier value from the primary access node; and responding to the first message dependent on the apparatus registered network identifier value being equal to any primary access node network identifier value.

The apparatus may be further caused to perform: receiving from the second apparatus at least one network identifier value; and comparing the at least one network identifier value from the second apparatus to the apparatus registered network identifier value; wherein responding to the first message is further dependent on any network identifier value from the second apparatus being equal to the apparatus registered network identifier value.

The apparatus may be further caused to perform determining the apparatus registered network identifier.

The apparatus registered network identifier value may comprise the registered public land mobile network identifier.

The apparatus may be further caused to perform: a tracking area update for the apparatus when the apparatus registered network identifier value is different from every primary access node network identifier value; updating the apparatus registered network identifier value; comparing the updated apparatus registered network identifier value to the at least one network identifier value from the second apparatus; and responding to the first message dependent on the updated apparatus registered network identifier value being equal to one network identifier values from the second apparatus.

The first message may be a Multimedia Broadcast-Multicast Service 'MBMSCountingRequest' message.

Responding to the first message may further cause the apparatus to perform: generating a Multimedia Broadcast-Multicast Service 'MBMSCountingResponse' message; and transmitting the Multimedia Broadcast-Multicast Service 'MBMSCountingResponse' message to an access node.

The apparatus may be a user equipment.

The second apparatus may comprise at least one of: a base station within a network with the network identifier value; and an enhanced NodeB (eNB) broadcasting a multimedia broadcast-multicast services control channel (MCCH).

The primary access node may comprise at least one of: a primary cell serving the apparatus; and a primary cell enhanced NodeB.

The apparatus may be further caused to perform monitoring at least one control channel from the second apparatus wherein the at least one control channel comprises the first message.

The network identifier value may be a public land mobile network identifier value.

The apparatus registered network identifier value may comprise the registered public land mobile network identifier value.

The at least one network identifier value may receive in a system information broadcast message.

The primary access node may be the second apparatus.

A computer program comprising computer executable instructions which when run on one or more processors may perform the method as described herein.

It should be appreciated that any feature of any aspect may be combined with any other feature of any other aspect.

BRIEF DESCRIPTION OF THE DRAWINGS

Embodiments will now be described in further detail, by way of example only, with reference to the following examples and accompanying drawings, in which.

DESCRIPTION OF SOME EMBODIMENTS OF THE APPLICATION

Figure 1:
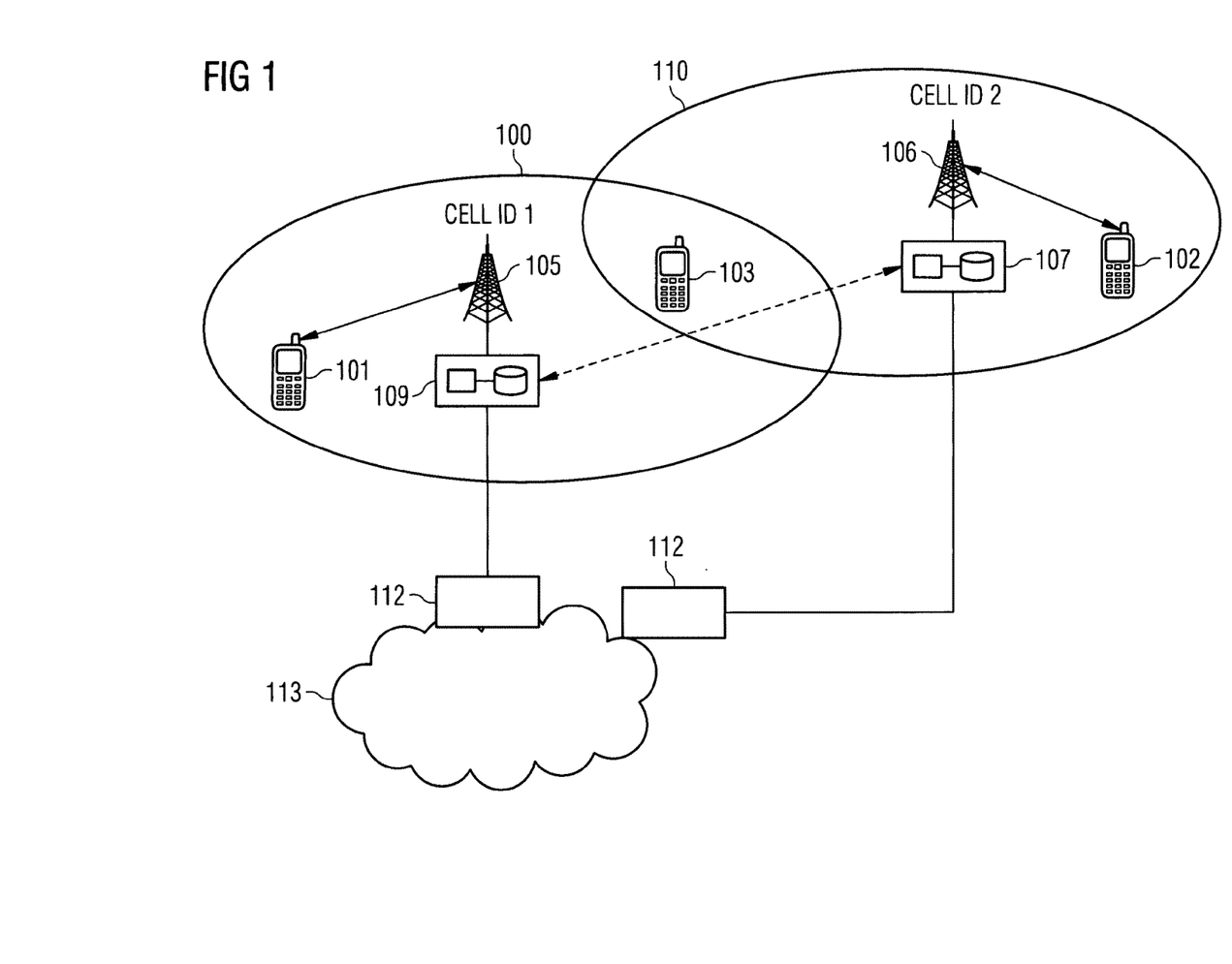
FIG. 1 shows a schematic diagram of a network according to some embodiments.
Figure 2:
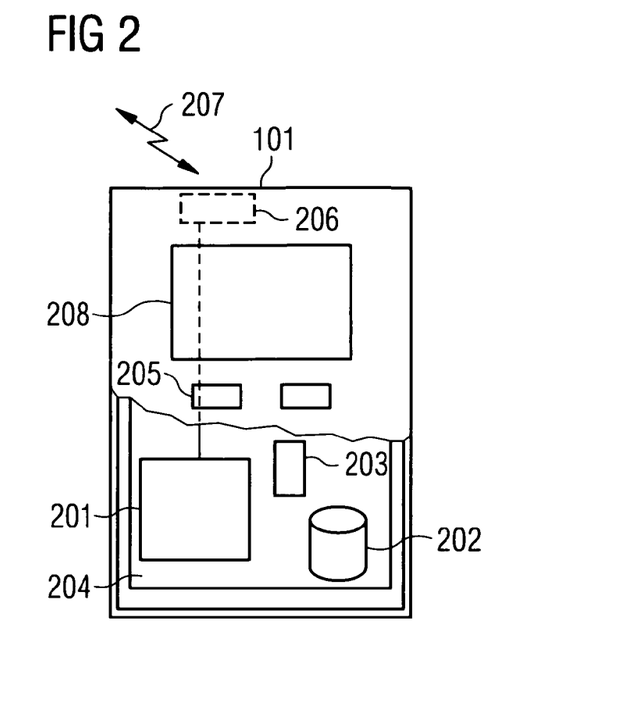
FIG. 2 shows a schematic diagram of a mobile communication device according to some embodiments.
Figure 3:
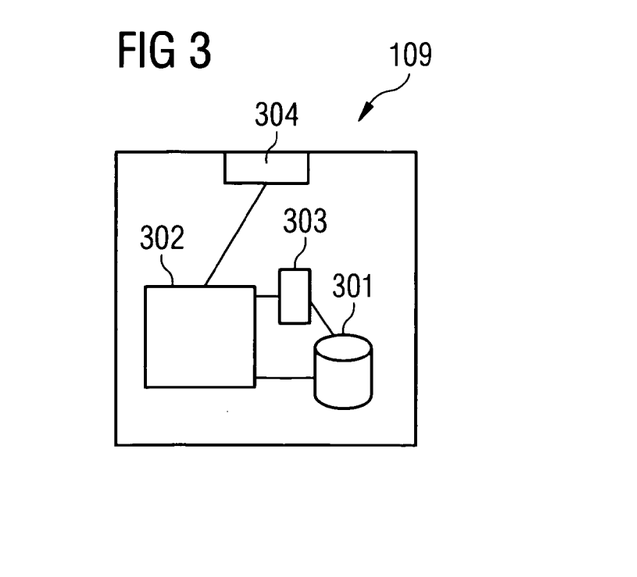
FIG. 3 shows a schematic diagram of a control apparatus according to some embodiments.

In the following certain exemplifying embodiments are explained with reference to a wireless or mobile communication system serving mobile communication devices. With reference to FIGS. 1 to 3 systems and apparatus within which embodiments of the application can be implemented are described to assist in understanding the application.

A communication device or user equipment 101, 102, 103, is typically provided wireless access via at least one base station or similar wireless transmitter and/or receiver node of an access system. In FIG. 1 two neighbouring and overlapping access systems or radio service areas 100, 110 are shown being provided by base stations 105, 106. In the following example the two neighbouring and overlapping access systems or radio service areas are operated by two separate operators and are considered to be fragments of two public land mobile networks (PLMN). Each of the PLMN can have associated with them a separate identification value or flag identifying the network to the communication device or user equipment operating within them.

However, it is noted that instead of two access systems, any number of access systems can be provided in a communication system. An access system can be provided by a cell of a cellular system or another system enabling a communication device to access a communication system. A base station site 105, 106 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, and base station 105, 106 may have one or more radio channels open at the same time and may send signals to and/or receive signals from more than one source.

Base stations 105, 106, are typically controlled by at least one appropriate controller apparatus 109, 107 so as to enable operation thereof and management of mobile communication devices 101, 102, 103, in communication with the base stations 105, 106, 108. The control apparatus 107, 109 can be interconnected with other control entities. The control apparatus 107, 109 can typically be provided with memory capacity 301 and at least one data processor 302. The control apparatus 107, 109 and functions may be distributed between a plurality of control units. In some embodiments, each base station 105, 106 can comprise a control apparatus 109, 107. In alternative embodiments, two or more base stations may share a control apparatus. Currently LTE does not have a separate radio network controller. In some embodiments the control apparatus may be respectively provided in each base station.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts a first cell 100 and a second cell 110. In this example the first cell 100 is a wide area base station cell 105, which can be a macro-eNB. The macro-eNB 105 transmits and receives data over the entire coverage of the cell 100.

The second cell 110 in this example is any suitable network node such as a wide area base station cell 106 which can be a further PLMN operator's macro-eNB or a small area base station cell such as a Home eNBs (HeNB) (femto cells) or pico eNodeBs (pico-eNB).

In some embodiments LTE network nodes can comprise a combination of wide area network nodes and small area network nodes deployed using the same frequency carriers (e.g. co-channel deployment). The coverage of the smaller area base station is generally smaller than the coverage of the wide area base stations. The coverage provided by smaller area nodes (pico or femto nodes) may overlap with the coverage provided by the macro-eNBs. Pico eNBs can be used to extend coverage of the macro-eNBs outside the original cell coverage of the macro-eNBs. The pico eNB can also be used to provide cell coverage in "gaps" or "shadows" where there is no coverage within the existing cells and/or may serve "hot spots". In some embodiments, the smaller area node can be a femto or Home eNB which can provide coverage for a relatively small area such as the home. Some environments may have both pico and femto cells.

As shown, the radio service areas can overlap. Thus signals transmitted in an area can interfere with communications in another area.

The communication devices 101, 102, 103, can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). Further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access system include those provided by base stations of systems that are based on technologies such as wireless local area network (WLAN) and/or WiMax (Worldwide Interoperability for Microwave Access).

In FIG. 1 the base stations 105, 106, of the access systems can be connected to a wider communications network 113. The controller apparatus 107, 109 may be provided for coordinating the operation of the access systems. A gateway function 112 may also be provided to connect to another network via the network 113. The base stations 105, 106, can in some embodiments be connected to each other by a communication link for sending and receiving data. The communication link can be any suitable means for sending and receiving data between the base stations 105, 106 and in some embodiments the communication link is an X2 link.

The other network may be any appropriate network. A wider communication system may thus be provided by one or more interconnect networks and the elements thereof, and one or more gateways may be provided for interconnecting various networks.

The communication devices will now be described in more detail with reference to FIG. 2. FIG. 2 shows a schematic, partially sectioned view of a communication device 101 that can implement embodiments of the application. Such a communication device is often referred to as user equipment (UE) or terminal. An appropriate communication device can in some embodiments be provided by any device capable of sending and receiving radio signals. The communication device can in some embodiments be mobile. Non-limiting examples of a communication device include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information.

The communication device 101 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

FIG. 3 shows an example of a control apparatus 109 (or 107) for a communication system, for example to be coupled to, included in and/or for controlling a station of an access system. In some embodiments the base stations 105, 106, each comprise a separate control apparatus, such as shown in FIG. 3. The control apparatus 109 can be arranged to provide control of communications by communication devices that are in the service area of the system. The control apparatus 109 can be configured to provide control functions in association with generation and communication of transmission patterns and other related information and for muting signals by means of the data processing facility in accordance with certain embodiments described below. For this purpose the control apparatus 109 comprises at least one memory 301, at least one data processing unit 302, 303 and an input/output interface 304. Via the interface the control apparatus can be coupled to a receiver and a transmitter of the base station. The control apparatus 109 can be configured to execute an appropriate software code to provide the control functions.

Figure 4:
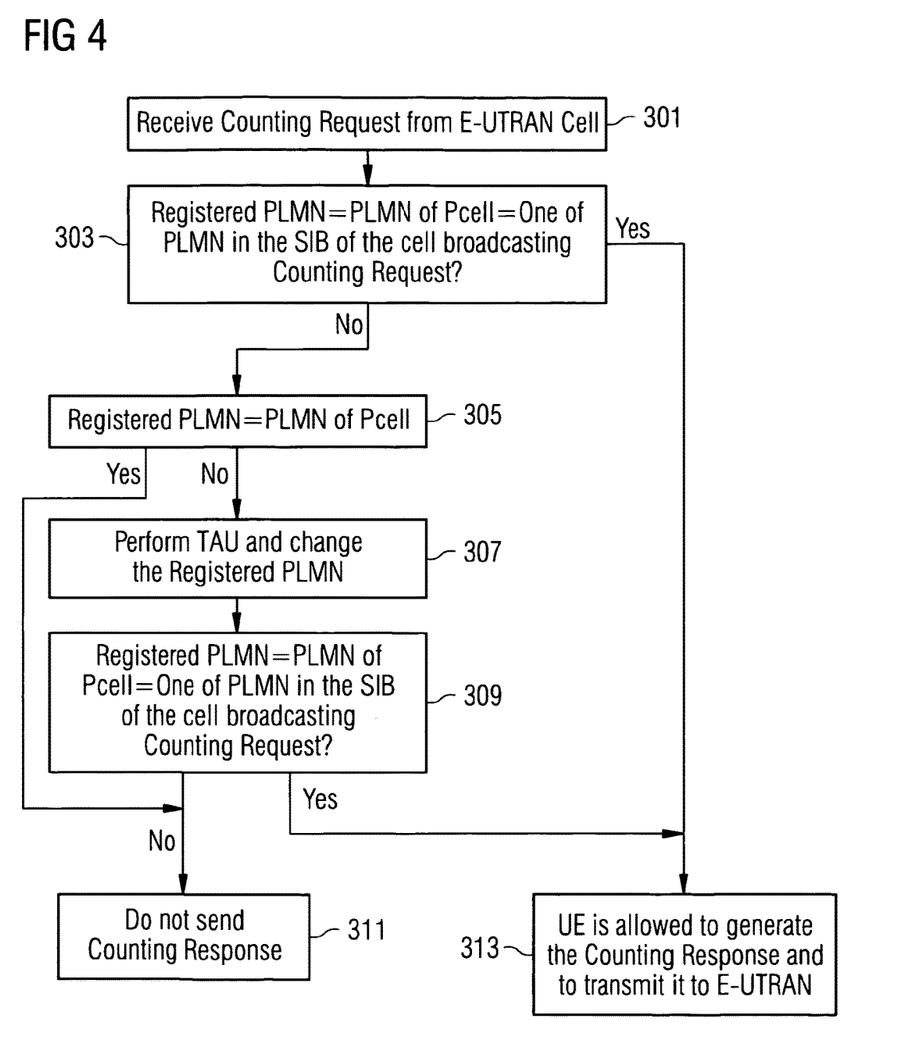
FIG. 4 shows a method of operating the mobile communication device according to some embodiments.

The operation and processes of some embodiments will now be described with reference to FIG. 4. FIG. 4 shows a flow diagram of a method according to some embodiments.

The communication device 103 can in some embodiments be configured to receive via the air interface a MBMS counting request 'MBMSCountingRequest' message from the E-UTRAN. An E-UTRAN cell, including that broadcasting the counting request, also broadcasts at least one identity of a PMLN as part of its System Information. The communication device 103 data processing entity 201 can then process the counting request.

The operation of receiving the counting request message from the E-UTRAN cell is shown in FIG. 4 by step 301.

The data processing entity 201 can then perform in some embodiments a first check to determine or compare whether or not both the cell broadcasting the counting request and the primary cell of the user equipment broadcast the current registered PLMN (RPLMN) value for the mobile device or user equipment as part of their System Informations.

The operation of performing the first PLMN check is shown in FIG. 4 by step 303.

In some embodiments the first check can be broken down into two sub checks. In such embodiments the first subcheck is one where the data processing entity 201 determines whether at least one of the primary access node (the Pcell) network identifier values (the PLMN values) is equal to the registered network identifier value (RPLMN value) of the user equipment. In other words whether the current registered network identifier value (RPLMN) for the user equipment is among the network PLMN identities sent from the primary cell.

A second sub-check is where the data processing entity 201 determines whether at least one of network identities values broadcast as part of System Information by the cell broadcasting the counting request is equal to the registered network identifier value (RPLMN value) of the user equipment. This second sub-check in other words is whether the current registered network identifier value (RPLMN) for the user equipment is among the network PLMN identities broadcast as part of System Information by the cell broadcasting the counting request.

Where the registered PLMN of the user equipment is among the PLMN identities broadcast as part of System Information by the cell broadcasting the counting request and among the network PLMN identities sent from the primary cell then the UE is permitted to generate a counting response operation (providing the UE passes any further required checks).

Where the registered PLMN user equipment value is not among the PLMN identities broadcast as part of System Information by the cell broadcasting the counting request or the registered PLMN user equipment value is not among the network PLMN identities sent from the primary cell then the data processing entity 201 can further perform a further or second PLMN check to determine or compare whether or not the current registered PLMN (RPLMN) value for the mobile device or user equipment is among the PLMN identities broadcast as part of System Information by the primary cell (Pcell) serving the user equipment.

The operation of performing the step of checking whether or not the current registered PLMN (RPLMN) value for the mobile device or user equipment is among the PLMN identities broadcast as part of System Information by the primary cell (Pcell) serving the user equipment is shown in FIG. 4 by step 305.

It would be understood that in some embodiments the 'second check' is the same as the first check, first sub-check operation and therefore in some embodiments the first sub-check result can be used to determine the result of the second check without the need to perform a further comparison.

Where, at step 305, the current registered PLMN (RPLMN) value for the mobile device or user equipment is only among the PLMN identities broadcast as part of System Information by the primary cell (Pcell) serving the user equipment then the UE is not permitted to generate a counting response because this means that none of PLMN identities in the system information of the cell broadcasting the counting request is equal to RPLMN or among the PLMN identities broadcast by Pcell.

Where the current registered PLMN (RPLMN) value for the mobile device or user equipment is not among the PLMN identities broadcast as part of System Information by the primary cell (Pcell) serving the user equipment then the processing entity 201 can check whether further conditions are met for generating and transmitting the MBMS counting response 'MBMSCountingResponse' message to the E-UTRAN.

Thus for example in some embodiments the data entity can be configured to perform a tracking area update (TAU) and furthermore where necessary based on the tracking area update change the registered PLMN.

The operations of performing a tracking area update/registered PLMN update is shown in FIG. 4 by step 307.

Furthermore following the tracking area update the data entity can then perform a further or third PLMN check where it is checked whether the current (and possibly updated due to the tracking area update) registered PLMN (RPLMN) value for the mobile device or user equipment is among the PLMN identities broadcast as part of System Information by the cell broadcasting the counting request.

The operation performing the further or third PLMN check is shown in FIG. 4 by step 309.

Where the current registered PLMN (RPLMN) value for the mobile device or user equipment is not among the PLMN identities broadcast as part of System Information by the cell broadcasting the counting request then the data entity determines that the UE is not permitted to generate a counting response.

The operation of supressing or not enabling the user equipment to generate or send a counting response is shown in FIG. 4 by step 311.

Where the current registered PLMN (RPLMN) value for the mobile device or user equipment is among the PLMN identities broadcast as part of System Information by the cell broadcasting the counting request then the data entity determines that the UE is permitted to generate a counting response (providing the processing entity 201 can determine whether any further conditions are met for generating and transmitting the MBMS counting response 'MBMSCountingResponse' message to the E-UTRAN).

The operation of enabling the user equipment to generate or send a counting response is shown in FIG. 4 by step 313.

It would be understood that in some embodiments the operations of performing a tracking area update do not configure the user equipment to perform the third PLMN check but instead disable the UE to send the counting response.

These embodiments can for example be described or implemented within the release 10 RRC specification TS 36.331 by the following 5.8.4.3 Reception of the MBMSCountingRequest message by the UE Upon receiving the MBMSCountingRequest, the UE in RRC_CONNECTED mode shall:
1> if the PCell broadcasts the identity of the Registered PLMN, and [NOTE: The UE may return to this step after performing RPLMN change as described herein following a TAU]
1> if the cell broadcasting the MBMSCountingRequest message broadcasts the identity of the Registered PLMN, and
1> if the UE is receiving via an MRB or interested to receive via an MRB at least one of the services in the received countingRequestList:
  2> if more than one entry is included in the mbsfn-AreaInfoList received in SystemInformationBlock-Type13:
    3> include the mbsfn-AreaIndex in the MBMSCountingResponse message and set it to the index of the entry in the mbsfn-AreaInfoList within the received SystemInformationBlock-Type13 that corresponds with the MBSFN area used to transfer the received MBMSCountingRequest message;
  2> for each MBMS service included in the received countingRequestList:
    3> if the UE is receiving via an MRB or interested to receive via an MRB this MBMS service:
      4> include an entry in the countingResponseList within the MBMSCountingResponse message with countingResponseService set it to the index of the entry in the countingRequestList within the received MBMSCountingRequest that corresponds with the MBMS service the UE is receiving or interested to receive;
  2> submit the MBMSCountingResponse message to lower layers for transmission upon which the procedure ends;

In such embodiments of the application the user equipment avoids generating and the cell receiving counting responses to a counting request message being broadcast in a PLMN to which the cell does not belong, and in a converse case a response to a counting request is received also from a user equipment just having entered a PLMN where a counting request is broadcast.

Furthermore in such embodiments the user equipment can avoid sending a counting response message after the handover until UE knows to which PLMN the current PCell belongs to.

It is noted that whilst embodiments have been described in relation to LTE, similar principles can be applied to any other communication system or indeed to further developments with LTE. Therefore, although certain embodiments were described above by way of example with reference to certain exemplifying architectures for wireless networks, technologies and standards, embodiments may be applied to any other suitable forms of communication systems than those illustrated and described herein. In some other embodiments the aforementioned embodiments can be adopted to orthogonal frequency division multiple access (OFDMA) frequency division duplex (FDD) based mobile communication system other than LTE.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the communication device, base station and/or control apparatus such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

Indeed there is a further embodiment comprising a combination of one or more of any of the other embodiments previously discussed.

The invention claimed is:

1. A method comprising: at a user equipment,
receiving a Multimedia Broadcast-Multicast Service (MBMS) counting request message from a first apparatus;
receiving from a primary access node, wherein the primary access node is different from the first apparatus, at least one network identifier value;
comparing a user equipment registered network identifier value to the at least one network identifier value received from the primary access node; and
responding to the MBMS counting request message dependent on the user equipment registered network identifier value being equal to any one of the at least one network identifier value received from the primary access node, wherein the first apparatus comprises at least one of a base station within a network with the network identifier value, and
an enhanced NodeB (eNB) broadcasting a multimedia broadcast-multicast services control channel (MCCH), and wherein the primary access node comprises at least one of a primary cell serving the user equipment, and a primary cell enhanced NodeB.

2. The method as claimed in claim 1, further comprising:
receiving from the first apparatus at least one network identifier value;
comparing the at least one network identifier value from the first apparatus to the user equipment registered network identifier value;
wherein responding to the MBMS counting request message is further dependent on any network identifier value from the first apparatus being equal to the user equipment registered network identifier value.

3. The method as claimed in claim 2, further comprising determining the user equipment registered network identifier value.

4. The method as claimed in claim 2, further comprising:
performing a tracking area update for the user equipment when the user equipment registered network identifier value is different from every network identifier value received from the primary access node;
updating the user equipment registered network identifier value;
comparing the updated user equipment registered network identifier value to the at least one network identifier value from the first apparatus; and
responding to the MBMS counting request message dependent on the updated user equipment registered network identifier value being equal to one of the network identifier values from the first apparatus.

5. The method as claimed in claim 1, wherein responding to the MBMS counting request message comprises:
generating a Multimedia Broadcast-Multicast Service 'MBMSCountingResponse' message; and
transmitting the Multimedia Broadcast-Multicast Service 'MBMSCountingResponse' message to an access node.

6. The method as claimed in claim 1, further comprising:
monitoring at least one control channel from the first apparatus wherein the at least one control channel comprises the MBMS counting request message.

7. The method as claimed in claim 1, wherein the network identifier value is a public land mobile network identifier value.

8. The method as claimed in claim 1, wherein the user equipment registered network identifier value comprises a registered public land mobile network identifier value.

9. The method as claimed in claim 1, wherein the at least one network identifier value is received in a system information broadcast message.

10. An apparatus comprising at least one processor and at least one memory including computer program code, the at least one memory and computer program code configured, with the at least one processor, to cause the apparatus to:
receive a MBMS counting request message from a second apparatus;
receive from a primary access node, wherein the primary access node is different from the second apparatus, at least one network identifier value;
compare an apparatus registered network identifier value to the at least one network identifier value received from the primary access node; and
respond to the MBMS counting request message dependent on the apparatus registered network identifier value being equal to any one of the at least one network identifier value received from the primary access node, wherein the second apparatus comprises at least one of a base station within a network with the network identifier value, and an enhanced NodeB (eNB) broadcasting a multimedia broadcast-multicast services control channel (MCCH), and wherein the primary access node comprises at least one of a primary cell serving the user equipment, and a primary cell enhanced NodeB.

11. The apparatus as claimed in claim 10, wherein the at least one memory and the computer program code configured to, with the at least one processor, cause the apparatus further to:
receive from the second apparatus at least one network identifier value; and
compare the at least one network identifier value from the second apparatus to the apparatus registered network identifier value;
wherein the apparatus responds to the MBMS counting request message based on any network identifier value from the second apparatus being equal to the apparatus registered network identifier value.

12. The apparatus as claimed in claim 11, wherein the at least one memory and the computer program code configured to, with the at least one processor, cause the apparatus further to:
determine the apparatus registered network identifier value.

13. The apparatus as claimed in claim 11, wherein the at least one memory and the computer program code configured to, with the at least one processor, cause the apparatus further to:
perform a tracking area update for the apparatus when the apparatus registered network identifier value is different from every network identifier value received from the primary access node;
update the apparatus registered network identifier value;
compare the updated apparatus registered network identifier value to the at least one network identifier value from the second apparatus; and
respond to the MBMS counting request message dependent on the updated apparatus registered network identifier value being equal to one network identifier values from the second apparatus.

14. The apparatus as claimed in claim 10, wherein the apparatus responds to the MBMS counting request message by:
generating a Multimedia Broadcast-Multicast Service 'MBMSCountingResponse' message; and
transmitting the Multimedia Broadcast-Multicast Service 'MBMSCountingResponse' message to an access node.

15. The apparatus as claimed in claim 10, wherein the at least one memory and the computer program code configured to, with the at least one processor, cause the apparatus further to:
monitor at least one control channel from the second apparatus wherein the at least one control channel comprises the MBMS counting request message.

16. The apparatus as claimed in claim 10, wherein the network identifier value is a public land mobile network identifier value.

17. The apparatus as claimed in claim 10, wherein the apparatus registered network identifier value comprises a registered public land mobile network identifier value.

18. The apparatus as claimed in claim 10, wherein the at least one network identifier value is received in a system information broadcast message.

19. A computer program product comprising a non-transitory computer-readable medium bearing computer program code embodied therein for use with a computer, the computer program code includes code for, at a user equipment:
receiving a Multimedia-Multicast Broadcast Service (MBMS) counting request message from a first apparatus;
receiving from a primary access node, wherein the primary access node is different from the first apparatus, at least one network identifier value;
comparing a user equipment registered network identifier value to the at least one network identifier value received from the primary access node; and
responding to the MBMS counting request message dependent on the user equipment registered network identifier value being equal to any one of the at least one network identifier value received from the primary access node, wherein the first apparatus comprises at least one of a base station with a network with the network identifier value, and an enhanced NodeB (eNB) broadcasting a multimedia broadcast-multicast services control channel (MCCH), and wherein the primary access node comprises at least one of a primary cell serving the user equipment, and primary cell enhanced NodeB.

* * * * *